US008846255B2

(12) United States Patent
Dineen

(10) Patent No.: US 8,846,255 B2
(45) Date of Patent: Sep. 30, 2014

(54) FUEL CELLS USED TO SUPPLEMENT POWER SOURCES FOR AIRCRAFT EQUIPMENT

(75) Inventor: Thomas D. Dineen, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 2086 days.

(21) Appl. No.: 11/737,889

(22) Filed: Apr. 20, 2007

(65) Prior Publication Data

US 2008/0261084 A1   Oct. 23, 2008

(51) Int. Cl.
| | |
|---|---|
| H01M 8/00 | (2006.01) |
| H01M 8/06 | (2006.01) |
| B64D 41/00 | (2006.01) |
| H01M 8/10 | (2006.01) |
| H01M 8/16 | (2006.01) |
| H01M 8/04 | (2006.01) |

(52) U.S. Cl.
CPC ........... *H01M 8/04208* (2013.01); *B64D 41/00* (2013.01); *H01M 8/1011* (2013.01); *Y02T 90/32* (2013.01); *H01M 8/16* (2013.01); *B64D 2041/005* (2013.01); *Y02T 90/36* (2013.01); *H01M 8/04216* (2013.01); *Y02E 60/527* (2013.01); *Y02E 60/523* (2013.01); *H01M 2250/20* (2013.01)
USPC .......................................... 429/400; 429/408

(58) Field of Classification Search
None
See application file for complete search history.

(56) References Cited

U.S. PATENT DOCUMENTS

| | | | |
|---|---|---|---|
| 4,697,761 A | 10/1987 | Long | |
| 4,709,882 A | 12/1987 | Galbraith | |
| 5,106,035 A | 4/1992 | Langford, III | |
| 6,296,957 B1 * | 10/2001 | Graage | ........................ 429/425 |
| 6,450,447 B1 | 9/2002 | Konrad et al. | |
| 6,568,633 B2 | 5/2003 | Dunn | |
| 6,641,084 B1 | 11/2003 | Huber et al. | |
| 6,834,831 B2 | 12/2004 | Daggett | |
| 6,854,688 B2 | 2/2005 | McElroy et al. | |
| 7,108,229 B2 | 9/2006 | Hoffjann et al. | |

(Continued)

FOREIGN PATENT DOCUMENTS

| | | |
|---|---|---|
| EP | 1-434-296 A | 6/2004 |
| EP | 1-455-405 A | 9/2004 |
| WO | WO 2005/060019 A | 6/2005 |

OTHER PUBLICATIONS

Ted Prescop, Fuel Cells Invade Next-Gen Mobile Equipment, COTS Journal, Nov. 2006, 6 pages.

(Continued)

*Primary Examiner* — Barbara Gilliam
*Assistant Examiner* — Adam A Arciero
(74) *Attorney, Agent, or Firm* — Shimokaji & Assoc., P.C.

(57) ABSTRACT

A fuel cell may be used to supplement power sources for aircraft equipment. A fuel cell to provide electrical power in an aircraft may include a replaceable fuel source, an information output, and a power output to output power to a line replaceable unit of the aircraft. A method of supplementing electrical power in an aircraft may include providing a fuel cell in the aircraft, the fuel cell comprising a replaceable fuel cartridge and a replaceable by-product cartridge, and supplementing an electrical power system of the aircraft with power generated by the fuel cell by outputting power.

6 Claims, 4 Drawing Sheets

(56) References Cited

U.S. PATENT DOCUMENTS

| | | |
|---|---|---|
| 7,172,702 B2 | 2/2007 | Hoffjann et al. |
| 2003/0096144 A1* | 5/2003 | Dunstan ............... 429/17 |
| 2003/0194589 A1* | 10/2003 | Pratt et al. ............. 429/22 |
| 2004/0124308 A1 | 7/2004 | Daggett |
| 2004/0219398 A1* | 11/2004 | Calhoon ............... 429/13 |
| 2005/0008924 A1* | 1/2005 | Malhotra ............... 429/38 |
| 2005/0039287 A1* | 2/2005 | Moser ................. 15/228 |
| 2005/0123814 A1* | 6/2005 | Calhoon ............... 429/26 |
| 2006/0138278 A1 | 6/2006 | Gans |
| 2006/0237583 A1 | 10/2006 | Fucke et al. |
| 2007/0026268 A1 | 2/2007 | Metzler et al. |

OTHER PUBLICATIONS

Euorpean Search Report dated Oct. 30, 2008.

* cited by examiner

FUEL CELLS USED TO SUPPLEMENT POWER SOURCES FOR AIRCRAFT EQUIPMENT

BACKGROUND OF THE INVENTION

The present invention relates generally to fuel cells and, more particularly, to fuel cells used to supplement power sources for aircraft equipment.

Modern aircraft include a variety of electrical devices. One airplane may include navigational equipment, communications equipment such as a radio, and emergency equipment such as an emergency locator transmitter. These devices may be embodied in individual cases or boxes known as line-replaceable units (LRUs).

Typically, power may be provided to an LRU from a power system powered primarily by one or more generators, each of which may be coupled to an aircraft engine. Additionally, a power system may receive power from an auxiliary power unit, such as a gas turbine.

Battery power may be used as a backup power supply for an LRU in the event of a power system failure due to, for example, loss of engine power. Similarly, capacitors may also be used to supply backup power to an LRU. Battery and capacitor backups (both of which may be referred to as "battery", "battery backup", or "battery power" herein) may enable an LRU to continue to operate even though no power is being received from the power system. Battery power may provide backup power supply for a limited time. Increasing the number of batteries may increase the amount of time that backup power is available. However, an increased number of batteries means an increased amount of weight.

In the event of a partial or complete power system failure, an aircraft crew may begin shutting down non-essential electrical systems in order to prolong backup power. The order in which non-essential electrical systems are shut down may be suggested by, for example, guideline, regulation, or accepted practice. There may, however, be certain essential items that the crew may want to avoid shutting down. For example, due to the specifics of the particular situation, the crew may want to keep a radio operational for as long as possible so as to request emergency assistance. If the crew keeps the radio on, the battery backup may eventually run out of energy and the radio will no longer function.

As can be seen, there is a need for a way to provide or supplement the supply of power to an LRU when power is otherwise unavailable from a normal power system. There is a need for a way to provide or supplement the supply of power that weighs less than conventional batteries. There is a need for a way to efficiently and practically provide or supplement the supply of power.

SUMMARY OF THE INVENTION

In one aspect of the present invention, a fuel cell may include a replaceable fuel source, an information output, and a power output to output power from the fuel cell to a line replaceable unit of a vehicle.

In another aspect of the present invention, a fuel cell to supplement electrical power in aircraft may include a replaceable fuel cartridge, a replaceable by-product cartridge, an information output to output information, and a power output to output power to the aircraft.

In another aspect of the present invention, a method of supplementing electrical power in an aircraft may include providing a fuel cell in the aircraft, the fuel cell comprising a replaceable fuel cartridge and a replaceable by-product cartridge, and supplementing an electrical power system of the aircraft with power generated by the fuel cell by outputting power from the fuel cell to the electrical power system.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, embodiments of the present invention may include a fuel cell to supplement power sources for aircraft equipment. Embodiments may be useful in a variety of applications, such as aircraft, ground vehicles or any situation in which supplemental power may be needed. For example, a fuel cell may be used to supplement power to an aircraft LRU. A fuel cell supplementing power to an aircraft LRU may extend the functional duration of the LRU by a significant measure, such as by 6-8 hours or more. A fuel cell supplementing power to an aircraft LRU may be lightweight relative to an equivalent battery configuration.

Embodiments of the present invention may differ from conventional vehicle power systems that lack fuel cells to provide power to an LRU at least by providing a fuel cell including a power output to output power to an LRU of a vehicle. Embodiments of the present invention may differ from conventional aircraft power systems that lack sufficient power backup at least by providing a fuel cell to supplement electrical power in an aircraft. Embodiments of the present invention may differ from conventional aircraft power systems that lack replaceable fuel cartridges at least by providing a fuel cell including a replaceable fuel cartridge. Embodiments of the present invention may differ from conventional aircraft power systems that lack replaceable by-product cartridges at least by providing a fuel cell including a replaceable by-product cartridge.

Figure 1:
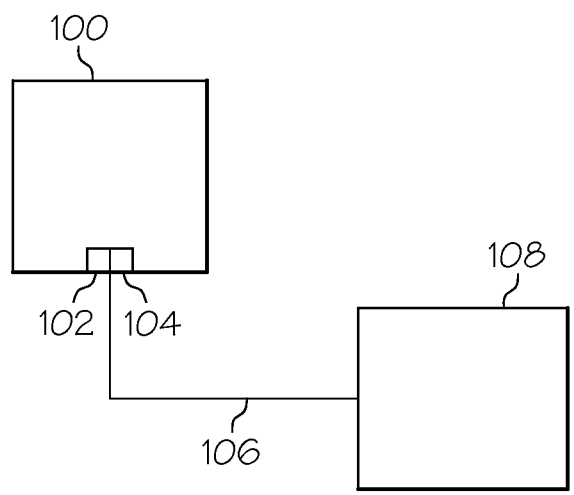
FIG. 1 is a schematic representation of a fuel cell and LRU according to an embodiment of the present invention.

FIG. 1 is a schematic representation of a fuel cell 100 and LRU 108 according to an embodiment of the present invention. The fuel cell 100 may include a power output 102 and an information output 104. The fuel cell 100 may be connected to an LRU 108 of an aircraft by a connection cable 106. The power output 102 may output power from the fuel cell 100 to the LRU 108. The power output 102 may be a post. The post may connect to the connection cable 106. Alternatives could be used and are considered to be within the scope of the present invention. Not by way of limitation, but by way of example, the power output 102 may be a receptacle into which a plug from a cable may be received.

The information output 104 may output information from the fuel cell 100 to the LRU 108. The outputted information may include one or more of a fuel cell on indicator, a remaining charge measure, or a remaining time measure. Outputted information may ultimately be provided to an aircraft crew display (such as a cockpit display).

The outputted information may be ARING 429 bus data. Alternatives could be used and are considered to be within the scope of the present invention. Not by way of limitation, but by way of example, the outputted information may be Military Standard 1553 bus data, Ethernet bus data, or USB bus data.

The connection cable 106 may transmit outputted power from the power output 102 of the fuel cell 100 to the LRU 108. The connection cable 106 may transmit outputted information from the information output 104 of the fuel cell 100 to the LRU 108. The connection cable 106 may be a single cable and may include two logical connections, one for outputted power and the other for outputted information. Alternatives could be used and are considered to be within the scope of the present invention. Not by way of limitation, but by way of example, two connection cables could be used, each including one logical connection.

The LRU 108 may be any suitable electrical device. The LRU 108 may be a navigational system, a communications system (such as a radio (an HF radio, a VHF radio, a SATCOM system, etc.), or an emergency system (such as an emergency locator transmitter). Additional alternatives could be used and are considered to be within the scope of the present invention. Not by way of limitation, but by way of example, the LRU 108 may be a global positioning system, an enhanced ground proximity warning system, a primary flight display, a transponder, a flight data recorder, or a traffic collision advisory system.

Figure 2:
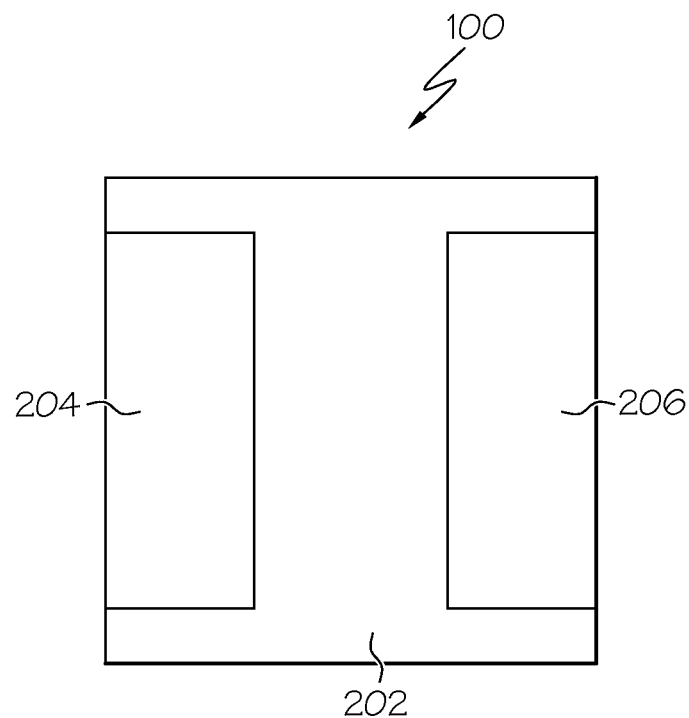
FIG. 2 is a schematic representation of a fuel cell, such as the fuel cell of FIG. 1.

FIG. 2 is a schematic representation of a fuel cell, such as the fuel cell 100 of FIG. 1. The fuel cell 100 may include a main body 202. The fuel cell 100 main body 202 may be similar in size to a notebook PC. Accordingly, depending on aircraft requirements, a fuel cell 100 may be located at a variety of locations in the aircraft, including with an LRU, such as the LRU 108 of FIG. 1, or in a centralized location. Alternative sizes are possible and are considered to be within the scope of the invention. Not by way of limitation, but by way of example, a larger or a smaller fuel cell main body may be used.

The fuel cell 100 may include a replaceable fuel cartridge 204 and a replaceable by-product cartridge 206. The replaceable fuel cartridge 204 and the replaceable by-product cartridge 206 may be replaced, for example, whenever an aircraft is in a hanger, or prior to flight.

The fuel cell 100 may be a methanol fuel cell, such as a direct methanol fuel cell (DMFC). An exemplary methanol fuel cell is the UltraCell25™ available from UltraCell Corporation, Livermore, Calif. Alternatives could be used and are considered to be within the scope of the invention. Not by way of limitation, but by way of example, a proton exchange membrane fuel cell (PEMFC) could be used, as could a bacterial fuel cell.

The main body 202 may include the devices necessary to convert a fuel from the replaceable fuel cartridge 204 and, if necessary, any additional element (such as oxygen) into a by-product (such as water) to be outputted into the replaceable by-product cartridge 206 (such as a replaceable water cartridge), thereby creating electricity. The main body 202 may include holders (not shown) to receive and hold the replaceable fuel cartridge 204 and the replaceable by-product cartridge 206. The holders may be recesses into which the replaceable fuel cartridge 204 and the replaceable by-product cartridge 206 may be inserted.

The fuel cartridge 204 may contain fuel. In an embodiment, the fuel may be a solution comprising methanol. Alternatives could be used and are considered to be within the scope of the invention. Not by way of limitation, but by way of example, a bacterial fuel could be used.

Figure 3:
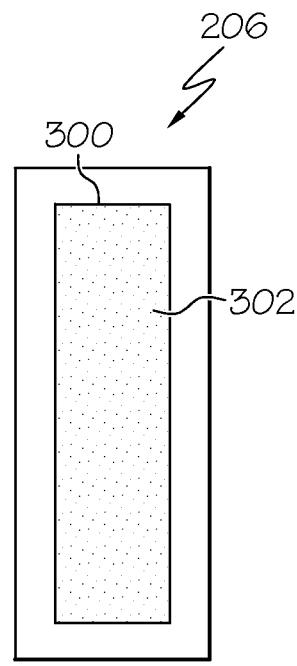
FIG. 3 is a schematic representation of a replaceable by-product cartridge, such as the replaceable by-product cartridge of FIG. 2.

FIG. 3 is a schematic representation of a replaceable by-product cartridge, such as the replaceable by-product cartridge 206 of FIG. 2. The replaceable by-product cartridge 206 may include a reservoir 300. The replaceable by-product cartridge 206 may include absorbent material 302 within the reservoir 300. The absorbent material 302 may be a synthetic lambskin. Alternatives could be used and are considered to be within the scope of the invention. The replaceable by-product cartridge 206 may include venting holes to allow water in an absorbent material to evaporate.

Figure 4:
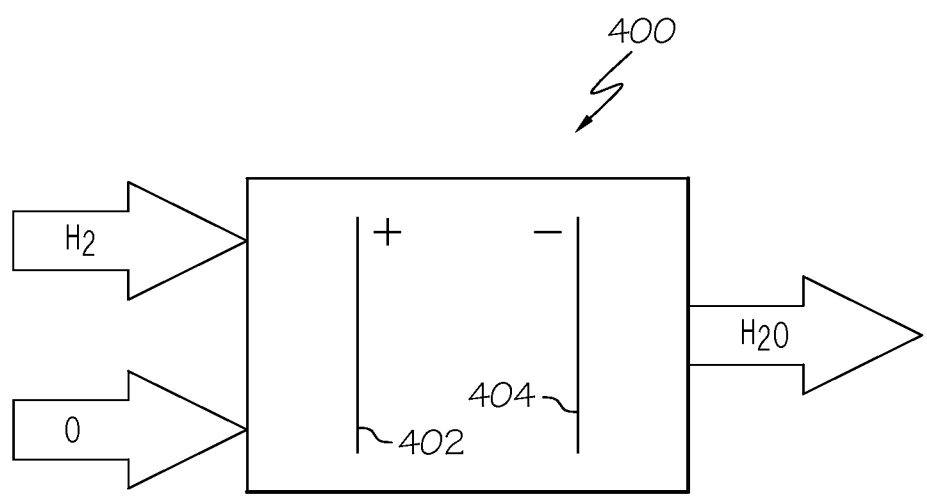
FIG. 4 is a schematic representation of the function of a fuel cell according to an embodiment of the present invention.

FIG. 4 is a schematic representation of the function of a fuel cell 400 according to an embodiment of the present invention. A fuel cell 400 may include an anode 402 and a cathode 404.

Oxygen and hydrogen may be inputted into the fuel cell 400. Oxygen may be supplied by ambient air. Hydrogen may be supplied by a fuel. In an embodiment, the fuel may be a solution comprising methanol. Alternatives could be used and are considered to be within the scope of the invention. Not by way of limitation, but by way of example, ethanol, or formic acid may be used as fuel.

Hydrogen may be inputted into the fuel cell 400 and directed near the anode 402. As a result, electrons and hydrogen ions may be split from hydrogen molecules. The electrons may be outputted from the fuel cell. Oxygen may be inputted into the fuel cell 400 and directed near the cathode 404. Negatively charged oxygen atoms may be formed attracting the hydrogen ions. The combination of the oxygen atoms and the hydrogen ions may result in water.

Figure 5:
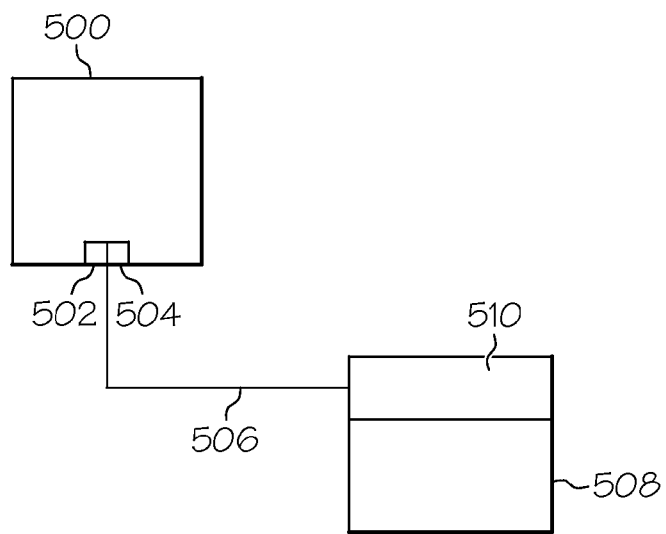
FIG. 5 is a schematic representation of a fuel cell and LRU according to an embodiment of the present invention.

FIG. 5 is a schematic representation of a fuel cell 500 and a LRU 508 according to an embodiment of the present invention. The LRU 508 may include an LRU power manager 510 (which is depicted in FIG. 5 as being a part of the LRU 508). The fuel cell 500 may be connected to the LRU 508 by a connection cable 506. The connection cable 506 may carry outputted power from the power output 502 to the LRU 508. The connection cable 506 may carry outputted information from the information output 504 to the LRU 508.

The LRU power manager 510 may determine power drawn from the fuel cell 500. The LRU power manager 510 may use LRU battery power or power from an aircraft power system for low power applications (i.e. normal applications). The LRU power manager 510 may draw power from the fuel cell 500 for high power applications to "charge" or supplement LRU battery power or power from the aircraft power system while the LRU 508 is running. Such a scenario may occur while the aircraft is flying and power from the aircraft power system is discontinued to the LRU 508.

Figure 6:
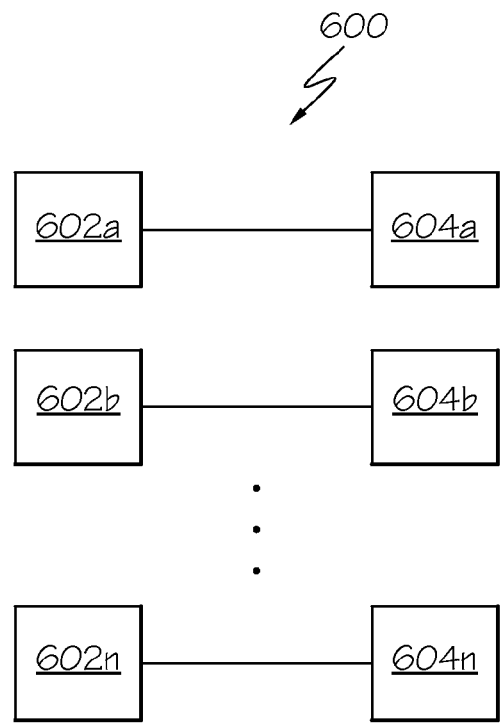
FIG. 6 is a schematic representation of a one to one configuration of fuel cells and LRUs according to an embodiment of the present invention.

FIG. 6 is a schematic representation of a one to one configuration 600 of fuel cells 602a,b, . . . n and LRUs 604a,b, . . . n according to an embodiment of the present invention. In the one to one configuration 600, a number of fuel cells 602a,b, . . . n may be connected to an equal number of LRUs 604a,b, . . . n. For example, two fuel cells may be connected to two LRUs. Accordingly, each LRU may be connected to one fuel cell providing power to that LRU.

Figure 7:
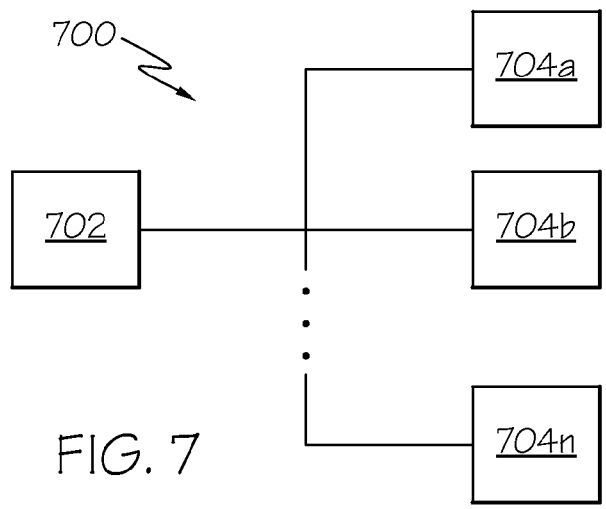
FIG. 7 is a schematic representation of a one to multiple configuration of a fuel cell and multiple LRUs according to an embodiment of the present invention.

FIG. 7 is a schematic representation of a one to multiple configuration 700 of a fuel cell 702 to LRUs 704a,b, . . . n according to an embodiment of the present invention. In the one to multiple configuration, a single fuel cell 702 may be connected to multiple LRUs 704a,b, . . . n. For example, one fuel cell may be connected to two LRUS. Accordingly, multiple LRUs may be connected to one fuel cell providing power to those LRUs.

Figure 8:
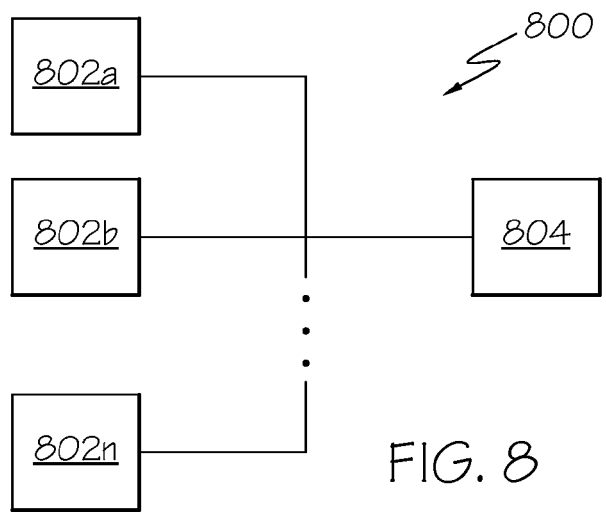
FIG. 8 is a schematic representation of a multiple to one configuration of fuel cells and an LRU according to an embodiment of the present invention.

FIG. 8 is a schematic representation of a multiple to one configuration 800 of fuel cells 802a,b, . . . n to an LRU 804 according to an embodiment of the present invention. In the multiple to one configuration 800, a number of fuel cells 802a,b, . . . n may be connected to one LRU 804. For example, two fuel cells may be connected to one LRU. Accordingly, a single LRU may be connected to multiple fuel cells providing power to that LRU.

Figure 9:
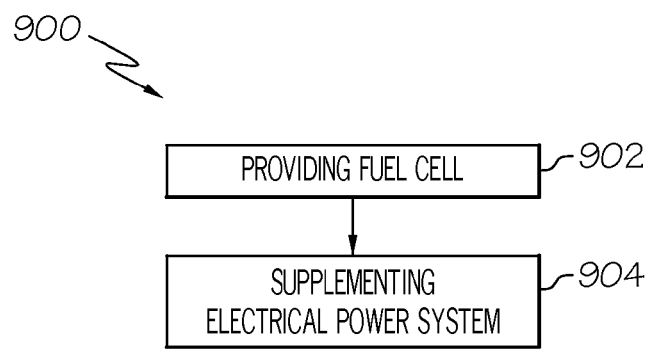
FIG. 9 is a schematic representation of a method of supplementing electrical power in an aircraft according to an embodiment of the present invention.

FIG. 9 is a schematic representation of a method 900 of supplementing electrical power in an aircraft according to an embodiment of the present invention. The method may include a step 902 of providing a fuel cell, such as the fuel cell 100 of FIGS. 1-3, and a step 904 of supplementing an electrical power system.

The step 902 of providing a fuel cell 100 may include providing a fuel cell 100 including a replaceable fuel cartridge 204 and a replaceable by-product cartridge 206. The step 904 of supplementing the electrical system may include supplementing an electrical power system of the aircraft with power generated by the fuel cell 100 by outputting power. Power may be output to an LRU, such as the LRU 108 of FIG. 1.

It should be understood, of course, that the foregoing relates to exemplary embodiments of the invention and that modifications may be made without departing from the spirit and scope of the invention as set forth in the following claims.

I claim:

1. A supplemental power source for a line-replaceable unit (LRU) of an aircraft comprising:
    a fuel cell dedicated to the LRU, the fuel cell comprising;
        a replaceable fuel cartridge;
        a replaceable by-product cartridge including an absorbent material in a reservoir; and
        an information output configured to produce signaling to an aircraft crew display; and
    a power output to output supplemental power from the fuel cell to the LRU.

2. The supplemental power source of claim 1, wherein the replaceable fuel cartridge contains a solution comprising at least one of ethanol, formic acid or bacteria.

3. The supplemental power source of claim 1, wherein the information output is configured to output at least one of a fuel cell on indicator, a remaining charge measure, or a remaining time measure.

4. The supplemental power source of claim 1, wherein the information output is configured to produce at least one of ARINC 429 bus data, Military Standard 1553 bus data, Ethernet bus data, or USB bus data.

5. The supplemental power source of claim 1, wherein the line-replaceable unit comprises at least one of a navigational system, a communications system, or an emergency system.

6. The supplemental power source of claim 1, wherein the fuel cell further comprises a main body configured with holders to receive the replaceable fuel cartridge and the replaceable by-product cartridge.

* * * * *